US006178280B1

United States Patent
Maxwell et al.

(10) Patent No.: US 6,178,280 B1
(45) Date of Patent: Jan. 23, 2001

(54) OPTICAL WAVEGUIDE DEVICE INCLUDING AN ELECTRICAL CAPACITIVE CONFIGURATION

(75) Inventors: Graeme D Maxwell, Ipswich; Douglas L Williams, Stowmarket; Raymond P Smith, Woodbridge, all of (GB)

(73) Assignee: British Telecommunications public limited company, London (GB)

( * ) Notice: Under 35 U.S.C. 154(b), the term of this patent shall be extended for 0 days.

(21) Appl. No.: 09/125,167
(22) PCT Filed: Jul. 8, 1998
(86) PCT No.: PCT/GB98/02002
  § 371 Date: Aug. 12, 1998
  § 102(e) Date: Aug. 12, 1998
(87) PCT Pub. No.: WO99/06875
  PCT Pub. Date: Feb. 11, 1999

(30) Foreign Application Priority Data

Jul. 30, 1997  (EP) ................................................. 97305712

(51) Int. Cl.$^7$ ...................................................... G02B 6/02
(52) U.S. Cl. ........................... 385/123; 385/37; 385/130; 385/132
(58) Field of Search ................................. 385/37, 123, 2, 385/4, 8, 122, 129, 130, 132

(56) References Cited

U.S. PATENT DOCUMENTS

| 5,265,178 | 11/1993 | Braun et al. . |
| 5,617,499 | 4/1997 | Brueck et al. . |
| 6,044,190 | * 3/2000 | Kashyap ................................. 385/123 |

FOREIGN PATENT DOCUMENTS

| 0193852 | 9/1986 | (EP) . |
| 0540386 | 5/1993 | (EP) . |
| 2241348 | 8/1991 | (GB) . |
| 62-133423 | 6/1987 | (JP) . |
| 1-010212 | 1/1989 | (JP) . |
| WO 87 07255 | 3/1987 | (WO) . |
| WO 90 08970 | 8/1990 | (WO) . |
| WO 96/16344 | * 5/1996 | (WO) ................................. 385/123 |
| WO 97/28481 | 8/1997 | (WO) . |

OTHER PUBLICATIONS

Marx et al, "Low–Loss Strain Induced Optical Waveguides in Strontium Barium Niobate (Sr/sub 0.6/Ba/sub 0.4 Nb/sub 2/0/sub6/) at 1.3 m$\mu$, Wavelength", Applied Physics Letters, Jan. 16, 1995, USA, vol. 66, No. 3, pp. 274–276.

Fujiwara et al, "Electro–Optic Modulation in Germanosilicate Fibre With UV–Excited Poling", Electronics Letters, vol. 31, No. 7, Mar. 30, 1995, pp. 573–575—XP000504320.

Abe et al, "Electro–Optic Switch Constructed with a Poled Silica–Based Waveguide On a Si Substrate", Electronics Letters, vol. 32, No. 10, May 9, 1996, pp. 893/894, XP000593720.

* cited by examiner

Primary Examiner—Cassandra Spyrou
Assistant Examiner—Craig Curtis
(74) Attorney, Agent, or Firm—Nixon & Vanderhye P.C.

(57) ABSTRACT

An optical device includes a waveguiding configuration and an electrical capacitive configuration. The capacitive configuration includes glass electrode region(s) and glass dielectric region(s) with electrical leads, e.g., metallic conductors, for applying electrical control signals to the electrode region(s). The preferred metals for the conductors are Ni, Ti and Au. The waveguiding structure is configured so that the fields associated with optical signals propagating therein interact with dielectric region(s). During the use of the device control signals are applied to the dielectric region(s) by the electrical leads. The control signals have the effect that temporary electric fields are applied to the dielectric region(s). The fields change the optical properties of the dielectric region(s) and this affects the propagation of the optical signals. The device can either be produced in planar or fibre configurations.

18 Claims, 10 Drawing Sheets

OPTICAL WAVEGUIDE DEVICE INCLUDING AN ELECTRICAL CAPACITIVE CONFIGURATION

RELATED APPLICATION

This application is related to co-pending commonly assigned U.S. application Ser. No. 09/068,084 now U.S. Pat. No. 6,044,190 filed May 4, 1998, entitled OPTICAL WAVEGUIDE STRUCTURE naming Raman Kashyap as inventor.

BACKGROUND OF THE INVENTION

1. Field of the Invention

This invention relates to optical devices which include a waveguiding configuration.

2. Related Art

SUMMARY OF THE INVENTION

It has been recognised that the application of an electrical field to a glass can change the optical properties of the glass. In particular the electric field can change the refractive index of the glass. Since the refractive index affects the velocity of light in the medium changing the refractive index changes the velocity of light and this can be used to produce phase modulation. Phase modulation can be used to produce other effects, e.g. a Mach Zehnder configuration converts phase modulation into on/off modulation.

According to this invention an optical device includes a waveguiding configuration and an electrical capacitive configuration wherein the capacitive configuration comprises glass electrode regions and glass dielectric regions with electrical leads, e.g. metallic conductors, for applying electrical control signals to the electrode regions. The preferred metals for the conductors are Ni, Ti and Au. The waveguiding structure is configured so that the fields associated with optical signals propagating therein interact with dielectric regions. During the use of the device control signals are applied to the dielectric regions by means of the electrical leads. The control signals have the effect that temporary electric fields are applied to the dielectric regions. The fields change the optical properties of the dielectric regions and this affects the propagation of the optical signals.

Optical devices according to the invention can be considered as glass structures which comprise a waveguiding configuration superimposed upon an electrical capacitive configuration. Both configurations are implemented as a base glass composition, e.g. silica, with various additives to produce the different regions of the waveguiding configuration and the electrical capacitive configuration.

As is conventional, the waveguiding configuration may either be in fibre or, preferably, planar format. In either case the waveguiding configuration comprises a core formed of one or more glass compositions and a cladding comprising one or more glass compositions. In a conventional waveguide, it is desirable that the core has a uniform refractive index and the cladding has a uniform (lower) refractive index. In other words, for a conventional waveguide, all the glasses comprised in the core should have the same refractive index and all the glasses comprised in the cladding should have the same (lower) refractive index. This conventional waveguiding structure may be modified in devices according to the invention. For example, as will be discussed in greater detail below, it may be convenient for electrode regions and/or dielectric regions to extend into both the core and cladding. Since it is clearly convenient for any one region to have a constant composition it follows that any one region will, conveniently, have a constant refractive index. This further implies that there may be places where the refractive index of the core will be equal to the refractive index of the cladding. This is unconventional in waveguide design but, at least for small regions, the waveguiding properties are not substantially degraded and this is acceptable to achieve better electrical properties.

The electrical capacitive configuration comprises one or more glass regions having a very high electrical resistivity to constitute the dielectric region or regions and glasses having a lower electrical resistivity to constitute the electrode region or regions. Since the changes in optical properties occur primarily in the dielectric regions it is necessary that these regions be located where they will interact with the fields of optical signals propagating in the waveguide. The dielectric regions may either be placed in the claddings to interact with the evanescent fields of signals travelling in the core or a more direct interaction can be achieved when the dielectric regions are located in the core.

Planar devices according to the invention are made using a combination of deposition techniques and photolithography. There are several well known techniques for depositing glasses onto substrates in order to make planar devices, e.g. flame hydrolysis, chemical vapour deposition and sol-gel deposition. A complicated structure will require several stages of deposition interspersed with several stages of photolithography. It is also necessary to incorporate the electrical leads at a suitable stage of the process. For fibre configurations, it is appropriate to prepare a preform, e.g. by vapour phase deposition, which is then pulled into a fibre. In this case it is usually more convenient to attach the leads after the pulling.

The preparation of devices according to this invention includes, as well as the stages mentioned above, polling to enhance the electrical effects. The purpose of polling is to introduce permanent electric fields into the structure. The fields are "permanent" in that they remain for the lifetime of the device. Polling comprises applying high voltages, e.g. 10–100 kv, to the dielectric regions of the device. It is convenient to apply the polling voltage by means of the leads connected to the electrode regions.

It is believed that the high voltages applied during polling cause the migration of electrons within the glass structure. This creates electron depletion regions which effectively have a positive electrical charge and electron excess regions which effectively have a negative electric charge. The permanent fields exist between the depletion region and the excess region.

During the polling the structure is preferably irradiated, e.g. with ultraviolet light (e.g. within the wavelength range 190 nm to 270 nm). The irradiation enhances the electrical conductivity of the glasses and it is convenient to define the effect of the irradiation as "photo-conductivity". The polling and irradiation may be carried out at ambient temperature but, in some cases, higher temperatures, e.g. 100° C. to 400° C., enhance the effect. It is also possible to achieve polling without irradiation, e.g. at high temperatures such as 100° C. to 400° C., but irradiation constitutes the preferred technique.

The polling applies high fields at a time when the electrical conductivity is enhanced and therefore electric charges (electrons) are more mobile. The result is that electric fields are produced in or near the dielectric regions. For example the fields are produced at or across the interfaces between the electrode regions and dielectric regions. When the enhancement is removed these fields remain and they become "permanent" as described above. In the use of the device control signals of 5–100 v are applied to the leads. The temporary fields produced by the control signals interact with the permanent fields to modify the optical properties of the dielectric region.

It is emphasised that the electrical conductivity is enhanced during the polling and the enhancement facilitates the movement of electric charges. When the enhancement is removed the electrical conductivities return to normal and the charges become trapped. It will be recognised that it is desirable to avoid conditions which will enhance the electrical conductivity after the polling has taken place. Unintended enhancement of the conductivity could allow the charges to leak and degrade the operational performance of the device. Thus it is advisable to avoid irradiation or heating of the device after polling. In other words, any shaping of the device which requires heating to high temperatures should be carried out before the polling. Temperatures which could result in charge leakage are higher than those to be expected in the normal use of telecommunications devices.

It is now convenient to discuss the chemical constitution of the preferred glasses which constitute the devices described above.

The major component of all the regions is silica, $SiO_2$. More specifically all of the regions contain at least 70% of weight by $SiO_2$. The dielectric regions which, as stated above, have the highest electrical resistance in the systems are preferably constituted of pure $SiO_2$ or $SiO_2$ lightly doped to adjust its refractive index in accordance with waveguiding requirements. Other regions are constituted by $SiO_2$ with various dopants to modify the properties and to produce the structure of the device. More specifically four dopants are particularly useful and these will be identified and their effects described. It is convenient to specify the dopants as elements although it will be appreciated that the elements are present in the glass in combined form. The four (elementary) dopants are germanium, phosphorus, boron and fluorine. The effects of each will now be described.

Germanium

Germanium is present in the silica glass compositions as $GeO_2$ and it has the effect of increasing the refractive index of the silica. In addition, germanium has the effect of increasing both the conductivity and photo-conductivity of the glass so that it is convenient for forming an electrode region. Where vapour phase deposition is used to prepare the devices the germanium can be introduced into the reactions as $GeCl_4$. Germanium may be present in the glass at concentrations of up to 20% by weight, e.g. 2–20% by weight, based on the element Ge and the total glass composition.

Phosphorus

Phosphorus may be present in the glasses in various forms but is believed that most of the phosphorus is present in the forms of phosphates of the other elements in the glass. In any case, phosphorus increases the refractive index of the glass and it also increases the electrical conductivity. The presence of phosphorus tends to soften the glass during processing and it is, therefore, sometimes convenient to use phosphorus as a processing aid. In vapour phase depositions phosphorus is usually fed into the reaction as $POCl_3$ or $POCl_3$. Phosphorus may be present at concentrations up to 15% by weight, e.g. 2–15% by weight, based on the element and the total glass composition.

Boron

Boron is probably present in the glass as $B_2O_3$ and it can be introduced into vapour phase deposition in the form of $BCl_3$. Boron has the effect of reducing the refractive index. Boron may be present at up to 15% by weight, e.g. 2–15% by weight, based on the element and the total glass composition.

Fluorine

Fluorine is probably present in the glasses as fluorides and it is introduced into vapour phase depositions in the form of $CCl_2F_2$ or $SiF_4$. Fluorine is similar to boron in that it reduces the refractive index and has little or no effect on the electrical properties. Fluorine may be present at up to 5% by weight based on the element and the total of glass composition.

The invention, which is more fully defined in the claims, includes devices comprising glass waveguiding and glass capacitive regions. It also includes methods of making these devices and more complicated devices which include them. Examples of more complicated devices include optical switches and modulators such as Mach Zehender modulators,

BRIEF DESCRIPTION OF THE DRAWINGS

This invention will now be described by way of example with reference to the accompanying drawings in which.

DETAILED DESCRIPTION OF EXEMPLARY EMBODIMENTS

Figure 1:
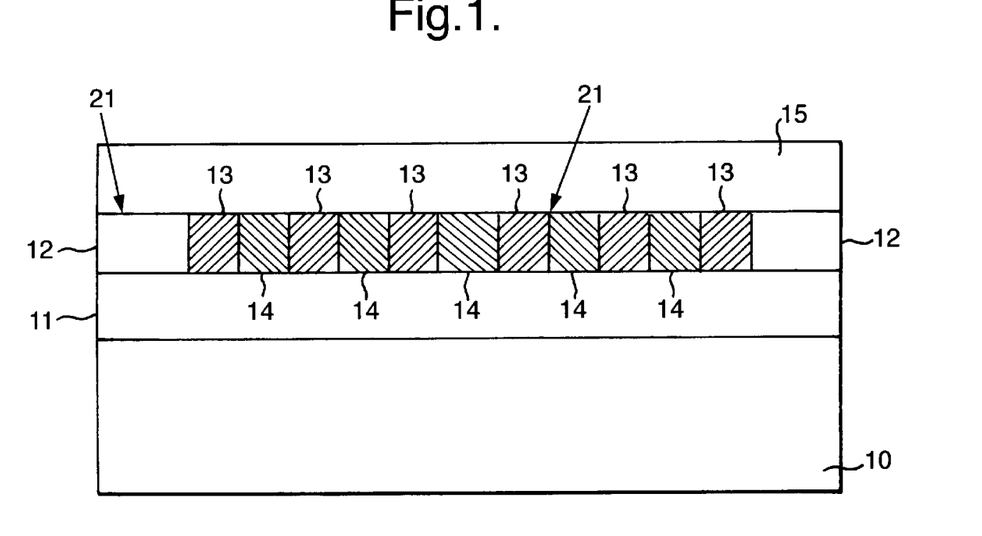
FIG. 1 is a longitudinal, vertical cross section through the core of a planar device.

The device shown in FIG. 1 has a silicon substrate 10 having a buffer layer 11 of silica. The buffer layer 11 is part of the cladding of the device.

The core, generally indicated by the numeral 21, is located on the buffer layer 11. The core comprises end portions 12 lightly doped with germanium to increase the refractive index. The core has a segmented construction comprising (as shown) six electrode segments each indicated by the numeral 13 and separated by dielectric segments each indicated by the numeral 14. It will be appreciated that the application of a control voltage to the electrode segments 13 applies electric fields to the dielectric segments 14. The electrode segments 13 are formed of silica highly doped with germanium and phosphorus with boron to reduce the refractive index. The presence of the germanium and the phosphorus raise the electrical conductivity and the photo-conductivity and relatively large concentrations are needed to achieve this. This tends to make the refractive index too high and boron is added to reduce the refractive index to the same value as the dielectric segments 14. The dielectric segments 14 have the same chemical composition and refractive index as the core ends 12.

The core is covered, and surrounded on both sides, with cladding 15 which has the same refractive index as the buffer layer 11. The cladding is doped with phosphorus and boron to facilitate processing in the preparation of the device.

Figure 2:
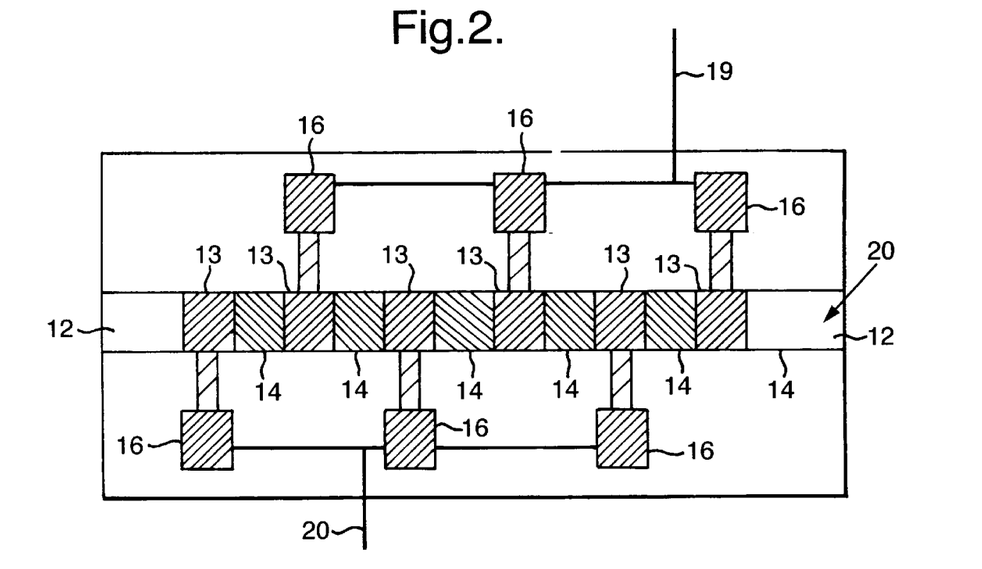
FIG. 2 is a horizontal cross section through the core shown in FIG. 1.

The horizontal cross section of the FIG. 2 shows that each of the electrode segments 13 has its own terminal generally indicated by the numeral 16. Because the electrode segments 13 are separated it is necessary that each of the electrode segments has its own terminal 16. As can also be seen from FIG. 2 half of the electrode segments 13 are connected to a metallic connector 19 and the other half are connected to a metallic connector 20. These connectors provide control voltages in the use of the device. (As will be explained later the connectors also provide polling voltages during the last stages of preparation.)

Figure 3:
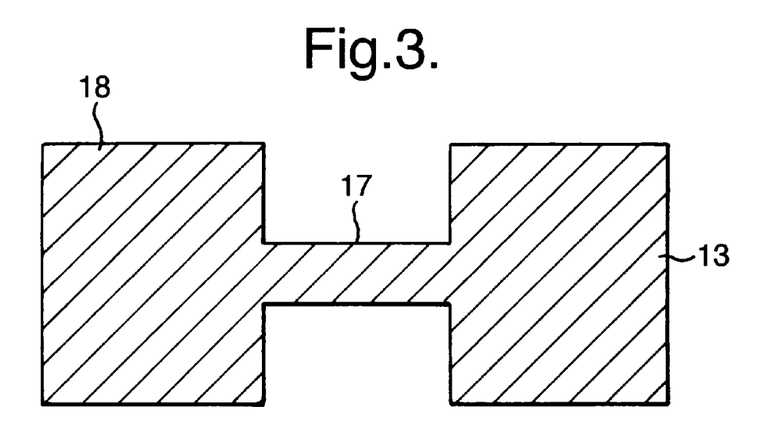
FIG. 3 is a horizontal cross section through a terminal.
Figure 4:
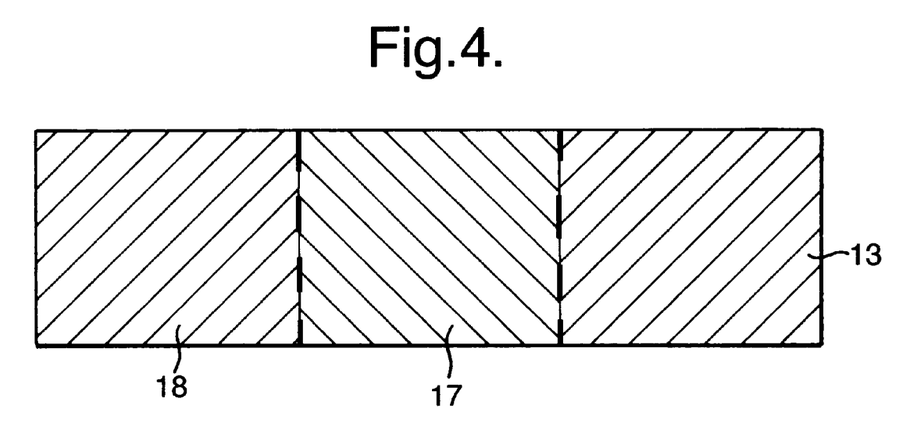
FIG. 4 is vertical cross section through a terminal as shown in FIG. 3.

All of the terminals 16 have the same configuration and this configuration is shown in FIGS. 3 and 4.

FIG. 3 is a plan view and it includes one of the electrode segments 13. The terminal, indicated by the numeral 16 in FIG. 2, comprises a head 18 and a tail 17. All of the regions 13, 17 and 18 are formed of the same glass composition and head 18 provides a convenient (large) structure for the attachment of the connectors 19 or 20. The tail 17 links the head 18 to the electrode segment 13. The terminals (i.e. the tails 17 and the heads 18) are located in the cladding of the waveguiding structure but they have the same refractive index as the core. Thus they represent a possible defect in the waveguiding function. The use of a narrow tail 17 minimises this disadvantage. As can be seen from the vertical cross section of FIG. 4 the terminal has the same height as the waveguide.

The structure illustrated in FIGS. 1–4 can be prepared using the conventional deposition and photolithography.

In the first stages the buffer layer 11 is produced on the substrate 10. This can be achieved by either oxidising the surface of the silicon substrate 10 or by depositing (pure) silica using flame hydrolysis. The preparation of the buffer layer 11 is followed by the deposition of a complete layer having the constitution of the electrode segments 13. This layer is the precursor of the electrode regions 13 and the terminals 16. After deposition, photolithography removes the unwanted material to leave behind the electrode segments 13 and terminals 16.

After etching, another complete layer is deposited. This layer has the composition of the dielectric segments 14 and it covers the whole of the surface and, therefore, fills in the gaps. After deposition the excess is removed to leave only the core 21 and terminals 16. The final cladding region 15 is deposited and selectively etched to expose the terminals 16 which are metalised and the metalic connectors 19 and 20 are attached.

At this stage the device is illuminated with UV light within the wavelength range 190 nm to 270 nm while applying a polling voltage of 1–30 kV. This causes the movement of charges within the device so that permanent fields are applied to the electrode segments 14. The illumination and the polling voltages are removed and these charges become trapped.

After polling, the device is complete and it can be connected into optical systems. The application of signal voltages, e.g. 5–150V, to the metallic connectors 19 and 20 changes the refractive index of the dielectric segments 14 whereby the phase of optical signals travelling in the core 21 is modified.

In an alternative, not shown in any drawing, the dielectric segments 14 have the same composition as the cladding 15. This has the effect that part of the core 21 has the same refractive index as the cladding 15 but, provided the segments 14 are small enough, the waveguiding properties are acceptable. This modification simplifies the preparation described above.

FIGS. 5–10 illustrate a modification in which the core 21 has a layered configuration instead of a segmented configuration. The core still has end portions 12 but it comprises four electrode layers 23 (specifically 23.1, 23.2, 23.3 and 23.4) separated by three dielectric layers 24 (specifically 24.1, 24.2 and 24.3).

Figure 5:
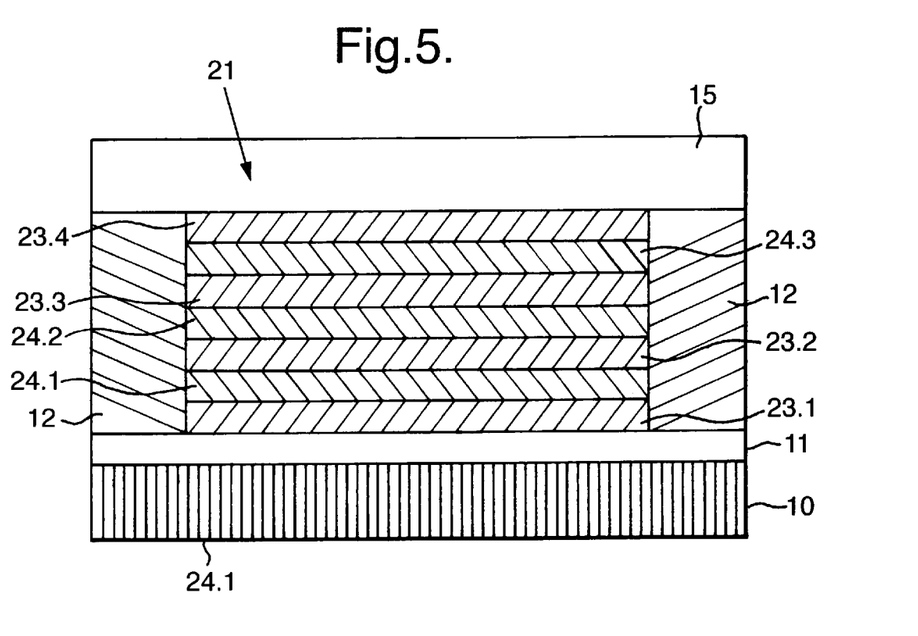
FIG. 5 is a vertical, longitudinal cross section through a layered core of a planar device.
Figure 6:
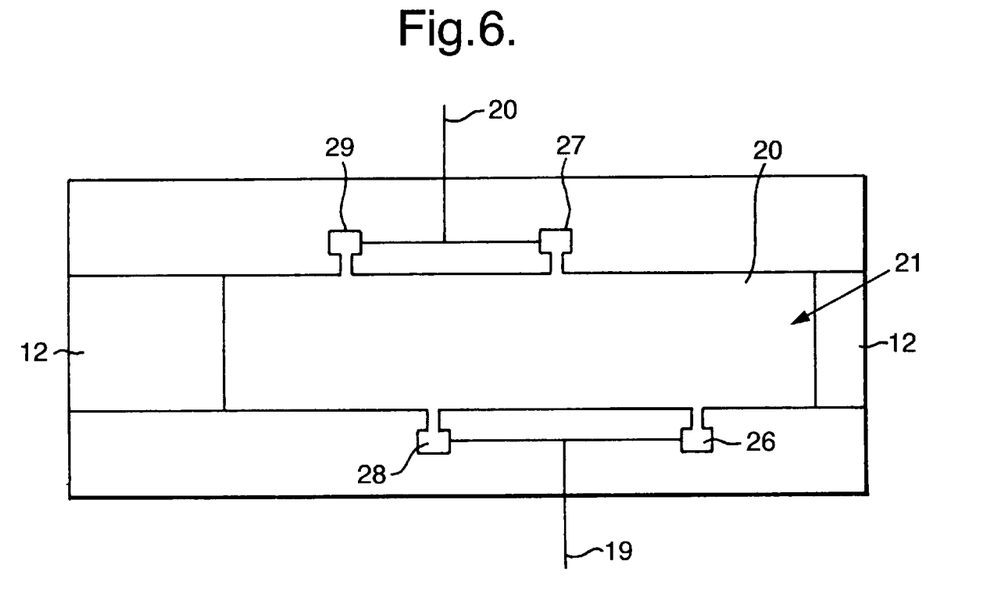
FIG. 6 is a horizontal view of the core and terminals of a device as shown in FIG. 5.

FIG. 6 shows a plan view of the device of FIG. 5 and it can be seen that there are four terminals 26, 27, 28 and 29 associated with the core. Specifically, there is one terminal for each of the dielectric layers 23. In plan view the four terminals have the same configuration as is shown in FIG. 3. However the vertical cross sections are different and these are shown in FIGS. 7–10.

Figure 7:
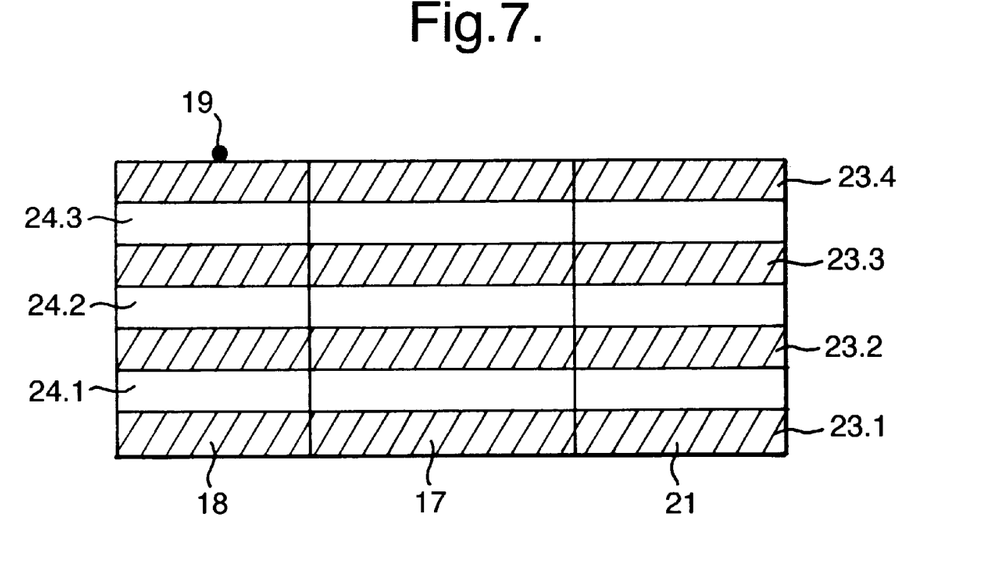
FIG. 7 is a vertical cross section through the terminal 26 of FIG. 6.

Terminal 26, illustrated in FIG. 7, has the same height as the core 21 and the connector 19 is indirectly attached to the top electrode layer 23.4.

Figure 8:
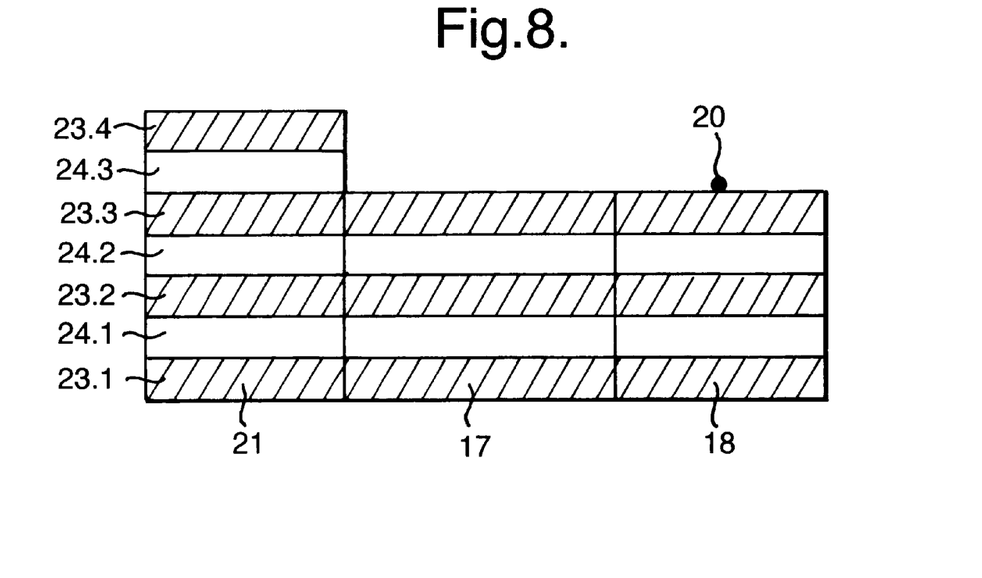
FIG. 8 is a vertical cross section through terminal 27 of FIG. 6.

Terminal 27, illustrated in FIG. 8, is similar but the electrode layer 23.4 and the dielectric layer 24.3 are removed so that the connector 20 is attached to the electrode layer 23.3.

Figure 9:
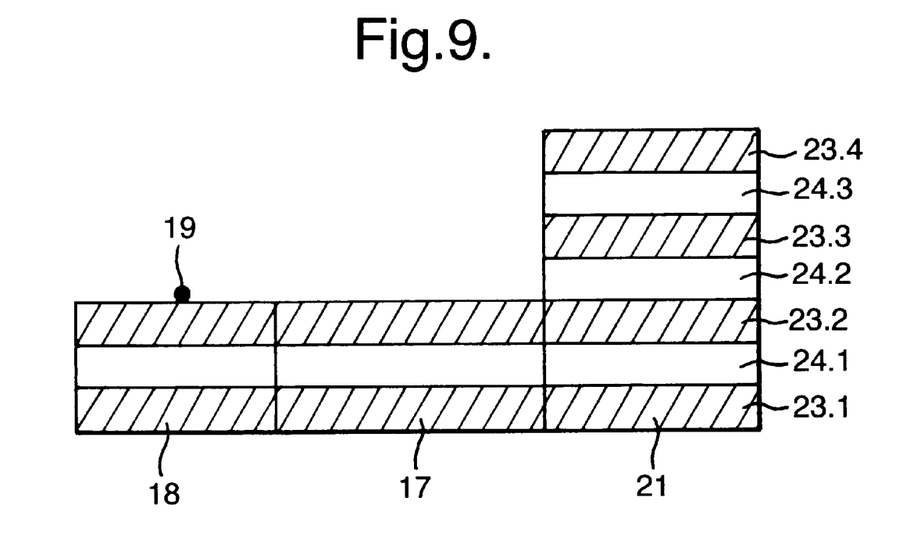
FIG. 9 is a vertical cross section through terminal 28 of FIG. 6.

The terminal 28, illustrated in FIG. 9, has two dielectric and two electrode layers and two dielectric layers (namely 23.4, 24.3, 23.3 and 24.2) removed so that the connector 19 is connected to lower electrode layer 23.2.

Figure 10:
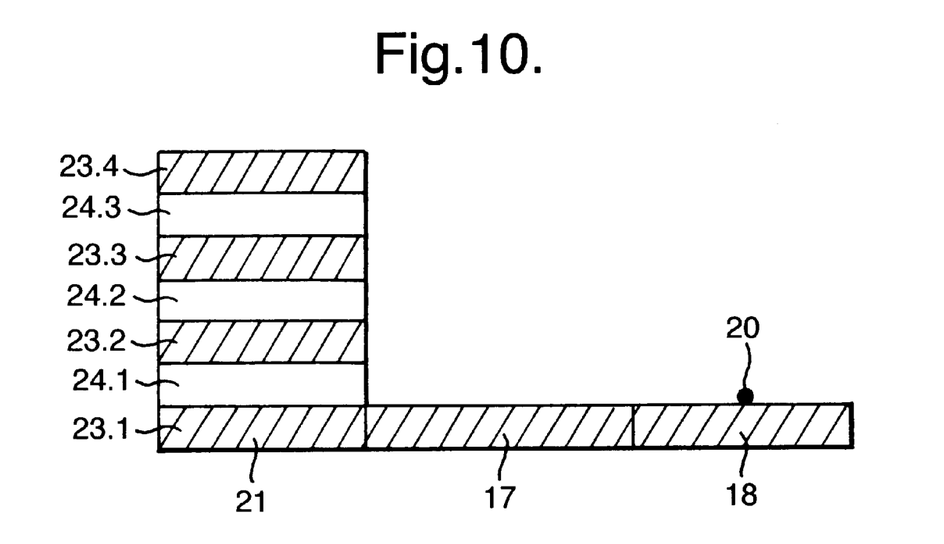
FIG. 10 is a vertical cross section through terminal 29 of FIG. 6.

Finally connector 29, illustrated in FIG. 10, has three electrode layers and all three dielectric layers removed so that the connector 20 is attached to the electrode layer 23.1.

The embodiment illustrated in FIGS. 5–10 is prepared in a similar manner to the previous embodiment. The regions 11, 23 and 24 are deposited, in sequence, as complete layers. The configuration is produced by four stages of etching. In the first stage the core 21 and the terminal 26 are masked (leaving terminals 27, 28 and 29 unmasked) and the layers 23.4 and 24.3 are removed. In the second stage the core 20 and the terminals 26 and 27 are all masked and layers 23.3 and 24.2 are removed. In the third stage the core 20 and terminals 26, 27 and 28 are all masked leaving terminal 29 unmasked and layers 23.2 and 24.1 are removed. In the last stage of etching the core 20 all of the terminals are masked and the etching is completed down to the buffer layer 11. It will be apparent that this produces the configuration shown in FIGS. 5–10. The cladding layer 15 is deposited and selective etched to expose the terminals 26, 27, 28 and 29. The exposed terminals are metalised and the connectors 19 and 20 are attached. At this stage the device is illuminated and polling carried out.

In the use of the device, control signals are applied to the connectors 19 and 20 and this applies electric fields to the dielectric regions 23. Thus the refractive index of a substantial length of the path is affected and hence phase modulation can be achieved.

Figure 11:
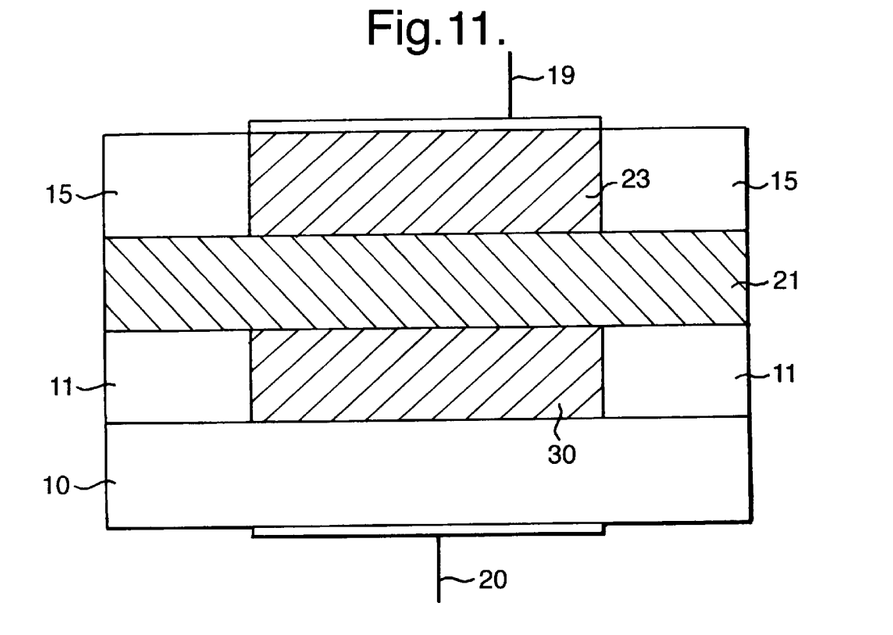
FIG. 11 is an longitudinal vertical cross section through the core and a terminal of an embodiment in which the silicon substrate is utilised as an electrical connector.
Figure 12:
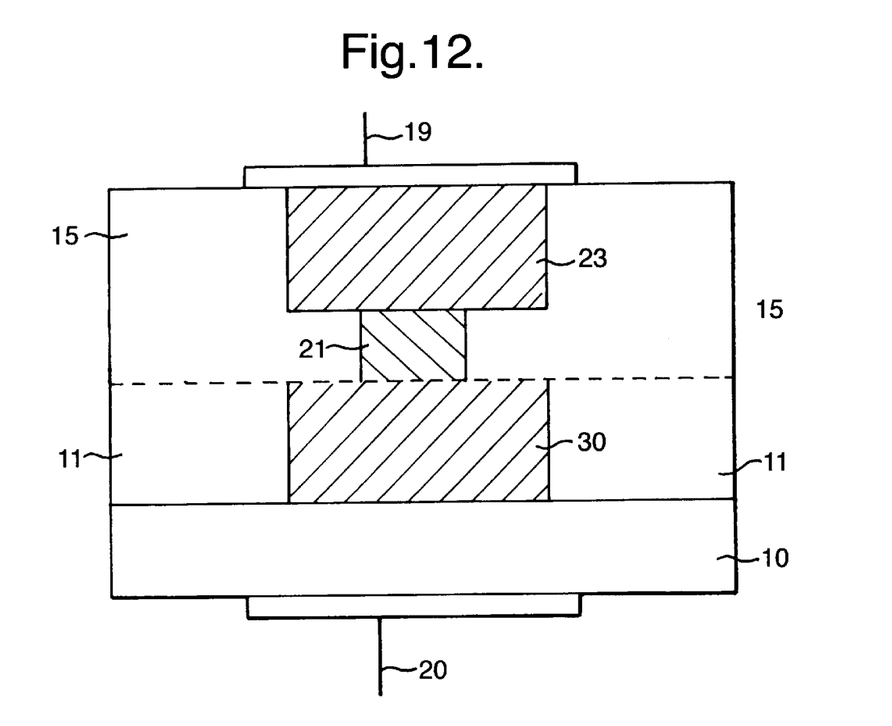
FIG. 12 is a transverse cross section through the core and terminal shown in FIG. 11.
Figure 13:
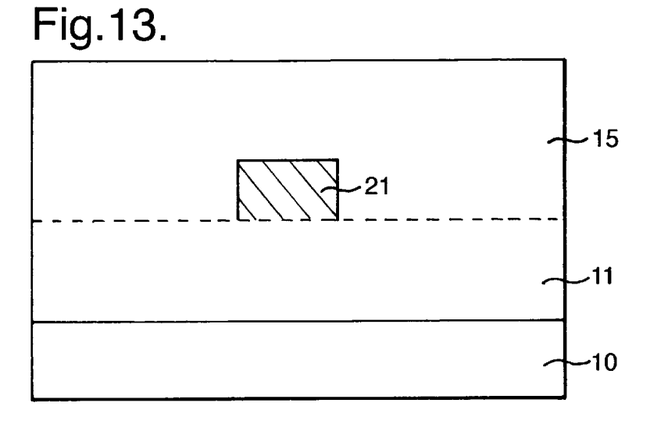
FIG. 13 is a transverse cross section through the core of the device shown in FIG. 11 (but not at the terminal).

The embodiment shown in FIGS. 11, 12 and 13 is supported on a silicon substrate 10 which forms part of the electrical system of the device. As can be seen from the longitudinal cross section FIG. 11, the device has a silicon substrate 10 and a longitudinally extending core at 21. Along part of its length the core 21 is supported on a lower electrode region 30 which makes electrical contact with the silica substrate 10. Along the remainder of its length the core 21 is supported on the buffer region 11. The buffer region 11 consists of pure silica, e.g. obtained by oxidising the substrate 10, and the lower electrode region 30 is doped with germanium and phosphorus to enhance the conductivity and photo conductivity. Boron and/or fluorine are present to match the refractive index to that of the buffer 11.

The core 21 is partly covered by the cladding 15 and an upper electrode region 23. The cladding 15 is formed of silica doped with phosphorus as a processing aid and with boron to match its refractive index to that of the buffer 11. The upper electrode region 23 is located opposite the lower electrode region 30 and both electrode region 23 and 30 have the same chemical composition. The electrode region 23 is metalised for the attachment of an external conductor 19 and the substrate 10 is metalised for the connection of an external connector 20. After attaching the connectors, the device is irradiated and polled as described above.

FIG. 12 shows a transverse cross section through the core 21 and the electrode regions 23 and 30. All of the regions 23, 15, 11 and 30 have the same refractive index which is lower than the refractive index of the core 21. FIG. 13 is a transverse cross section which does not pass through the regions 23 and 30 and, therefore, the configuration is simpler. The core 23 is surrounded by buffer 11 and cladding 15. Both of FIGS. 12 and 13 show that there is a conventional waveguiding structure in which a core 21 is surrounded by a cladding of lower refractive index.

The device shown in FIGS. 11–13 is relatively simple to make. A complete buffer layer 11 is provided on the silica substrate 10, the complete, uniform layer. This layer is etched to provide a groove for the lower electrode region 30 which is deposited after the etching. The excess material is removed by etching to leave a structure comprising regions 10, 11 and 30 of FIG. 11.

A complete layer of core material is deposited over the whole structure and etched to leave the core 23. After the core 23 has been formed, cladding 15 is deposited over the whole structure and a groove is removed by selective etching and the groove is filled with upper electrode region 23. The device is now metalised, external contacts 19 and 20 are provided and polling is carried out as described above.

In the arrangement of FIGS. 11–13, substantially the whole of the path 21 constitutes the dielectric region of the electrical system so that changes in the electrical properties of the core 21 have a maximum effect upon the transmission of optical signals. There are two electrode regions (23 and 30) and a single dielectric region namely the core 21.

It should be noted that, in arrangement of FIGS. 11–13, the silicon substrate 10 is part of the electrical system. The lower electrode region 30 makes electrical contact with the substrate and the connector 20 is connected to the substrate 10 to complete the circuit. It should also be noted that, in this embodiment, that the whole of the path 21 constitutes the dielectric region of the electrical system so that changes in the optical properties of core 21 have a maximum effect upon the transmission of optical signals. It should also be noted that there are two electrode regions (23 and 30) and only a single dielectric region, namely the core 21.

The embodiments described with respect to FIGS. 1–13 are all planar devices supported on a silicon substrate. In the remaining figures the devices have a fibre format. In these examples the fibre devices were prepared using the well-known inside deposition process. The inside deposition process begins with a silica substrate tube and gaseous reactants are passed through the bore of the tube. The tube is heated so that the various regions are deposited on the inside of the tube and an annular configuration is built up from the outside inwards. When the last layer has been deposited the tube is collapsed into a rod. In a modification, usually known as "rod-in-tube", a rod is inserted into the bore of the tube, usually after one or more layers has been deposited on the inside surface of the bore. The tube is collapsed to consolidate with the rod into a single unit. Furthermore, the rod may have a composite (annular) structure which can be prepared by the inside deposition process. Thus it is well understood that rod-like preforms can be prepared.

After the preform has been prepared it is transferred to a drawing-machine in which the length is stretched many times. Although the pulling changes the sizes it does not change the fundamental configuration.

To prepare fibre devices according to the invention two flat, parallel surfaces are ground on the preform to expose inner regions of the preforms. The end portions of the preforms are provided with circular cross sections so that the preform may be fitted into the pulling machine. After pulling the fibre is cut into device lengths, e.g. 1 mm–100 mm, and the segments are metallised on the flat surfaces, exposed to radiation and polled to produced a finished fibre device.

Figure 14:
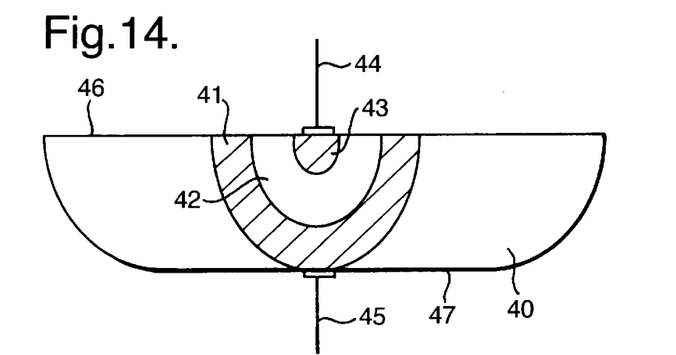
FIG. 14 is a transverse cross section through a fibre device.
Figure 15:
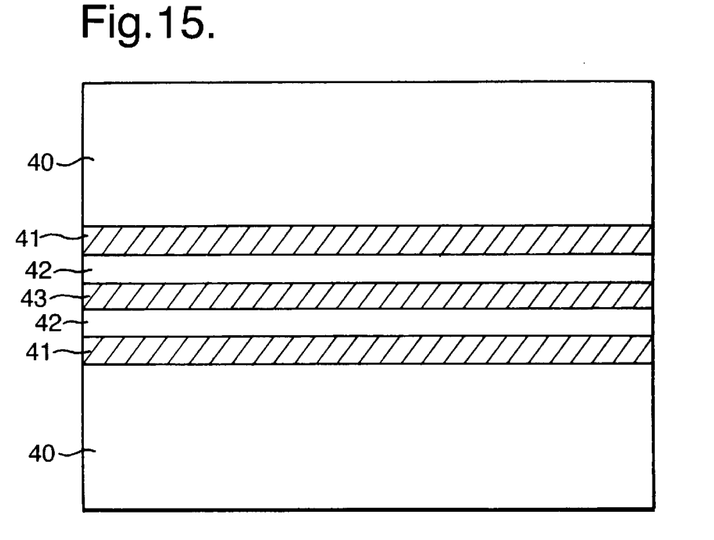
FIG. 15 is an longitudinal cross section through the device illustrated in FIG. 14.
Figure 16:
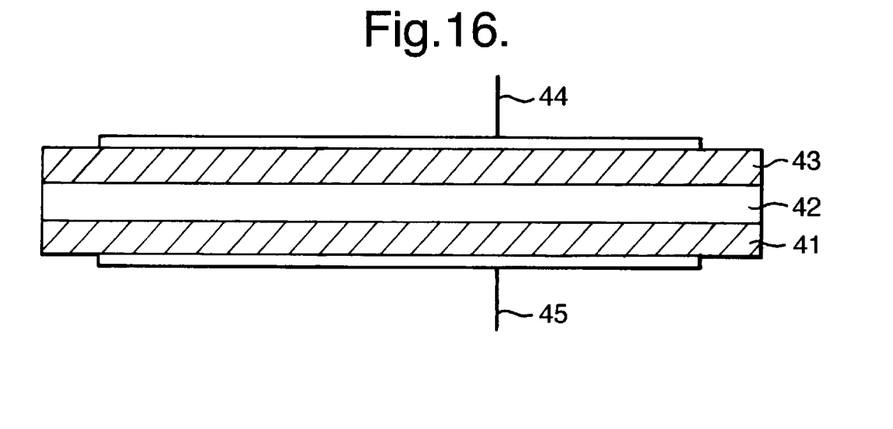
FIG. 16 is a longitudinal cross section at right angles to FIG. 15.

A first fibre configuration is illustrated in FIGS. 14–16.

FIG. 14 shows the annular cross section (which is derived from the annular structure of the preform). The, normally circular, cross section of the fibre has been modified by the parallel, flat surfaces 46, 47 which were originally ground onto the preform. Especially in FIG. 14, it can be seen that the fibre comprises a core region 43 which is highly doped with germanium and phosphorus plus boron to adjust to the refractive index to provide an electrode region which is part of the core. The electrode region 43 is surround by a silica region 42. The region 42 constitutes the dielectric region of the device and it is also part of the core. The dielectric region 42 it surround by an outer cladding electrode 41 which is doped with germanium and phosphorus to give the electrical conductivity plus boron and/or fluorine to reduce the refractive index to that of the core. Finally, the device comprises region 40 which represents the remnants of the substrate tube which was used at the beginning the preparation. The flats 46, 47 expose the inner core 43 for the attachment of the connector 44 and the outer electrode 42 for the provision of the connector 45.

FIG. 15 is a longitudinal cross section parallel to the flat surfaces 46, 47 of FIG. 14. This cross section shows the longitudinal extending core comprising the regions 42 and 43 and it also show the residues of the substrate 40. FIG. 15 emphasises that, in this cross section, electrode regions are not exposed and, therefore there are no connectors in this plane.

FIG. 16 is a longitudinal cross section at right-angle to the flat surfaces 46, 47 of FIG. 14. This cross section also shows the longitudinal extent of the core comprised by regions 42 and 43 and it also shows the that region 43 is exposed for the attachment of an electrode. Region 41 is also similarly exposed. It will be appreciated that, in order to expose the electrode regions 41 and 43 the core is partially exposed. However, air has a lower refractive index than the glass of which the fibre is composed and waveguiding is still effective. Also, as mentioned above, it is possible to encapsulate the device in order to enhance the waveguiding property.

During polling the device has to be illuminated and it is appropriate to utilise a beam which is parallel to the flat surfaces so that the radiation does not have to penetrate any metallisation used to form of the contacts.

Figure 17:
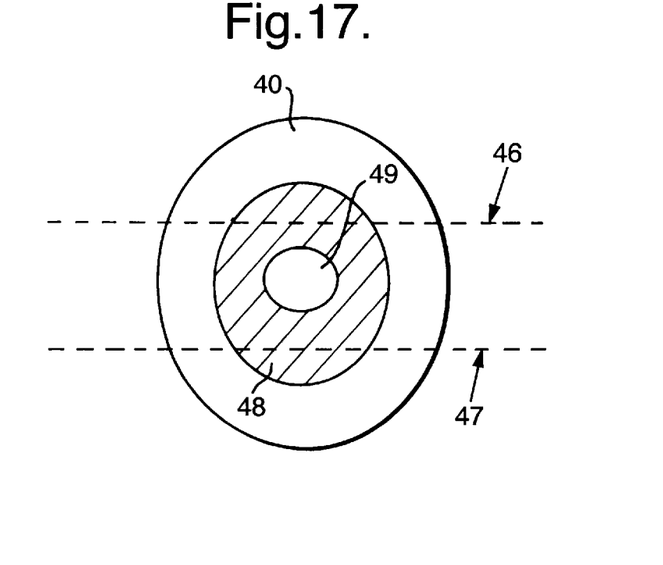
FIG. 17 is a transverse cross section through a preform for making a fibre device with one electrode region and one dielectric region.
Figure 18:
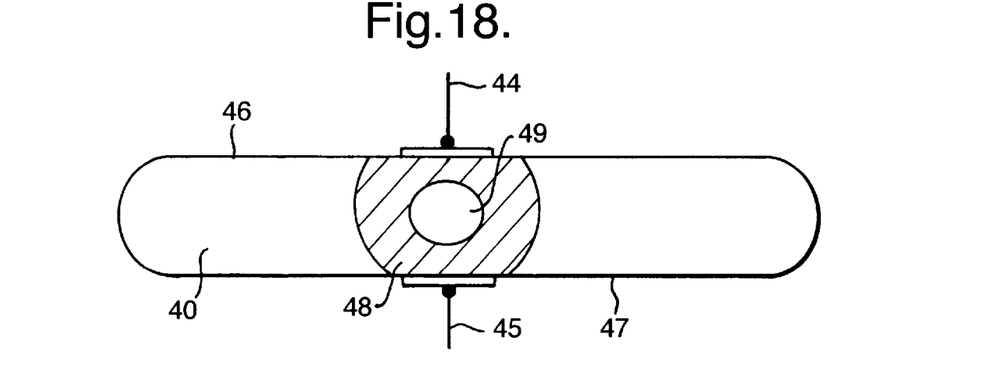
FIG. 18 is a transverse cross section through fibre prepared from the preform of FIG. 17.
Figure 19:
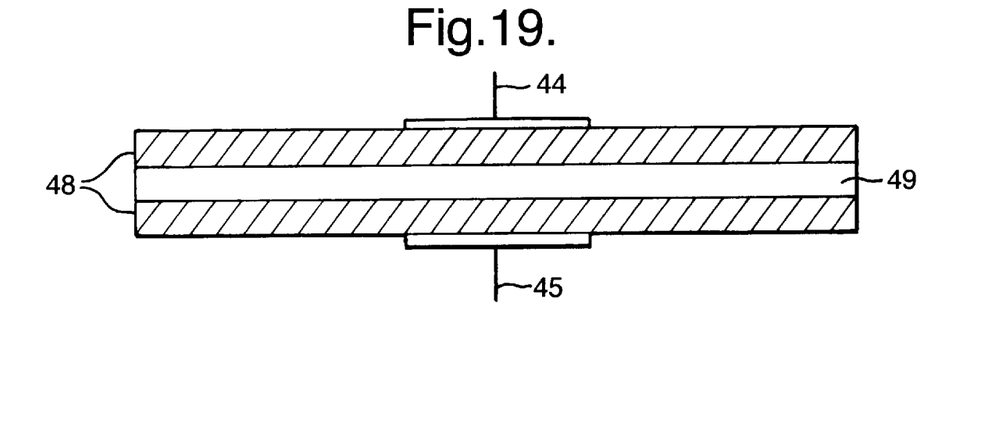
FIG. 19 is a longitudinal cross section of the fibre shown in FIG. 18.

FIG. 17, 18 and 19 illustrate a fibre embodiment of the invention which has only one dielectric region located in the core and one electrode region located in the cladding. The preparation begins with a substrate tube 40 which is made of pure silica. An annulus 48 is deposited onto the inner surface of the substrate tube 40. The annulus 48 is formed of the silica highly doped with germanium and phosphorus to increase the electrical conductivity and the enhanced electrical conductivity. The annulus 48 is also doped with boron and/or fluorine to reduce the refractive index below that of the substrate tube 40. A rod 49 of pure silica is provided into the bore by the rod-in-tube process. Preparation of the perform is completed by the grinding flats 46 and 47 onto the longitudinally central portion of the perform. It will be noted that this grinding exposes two flats on the annulus 48.

The perform is pulled into fibre which is metallised on the flat surfaces 63, 64 and connectors 44 and 45 are provided. FIG. 18 also shows that the core 49 is completely surrounded by the electrode region 48 and remnants of the substrate tube 40 are also illustrated.

The longitudinal cross section of FIG. 19 shows that there is a longitudinally extending core 49 of pure silica which is contact with a single region 48 doped for electrical conductivity. The connectors 44 and 45 can also be seen. In all of the embodiments previously described the illumination during polling is uniform so that the whole of the glass doped for conduction is given enhanced conductivity. In the embodiment shown in FIGS. 17–19 the illumination is non-uniform. More specifically the illumination consists of longitudinally extending segments of bright and dark (zero) illumination. The polling voltage is applied while this banded illumination is applied.

It will be noted that the two connectors 44 and 45 are both applied to the same conductive region 48 but they are spaced apart (in fact they are diametrically opposite). The result is that electrical charges move within the illuminated bands of the structure and, when the illumination is removed, these charges become locked so that there is a permanent electric field. In the use of the device small voltages are applied to the connectors 44 and 45 and the (normal) conductivity of the single electrode region 48 is such that control voltages are applied to the core 49.

It is emphasised that, in this embodiment, there is only one dielectric region which constitutes the whole cross section of the core 49. Furthermore there is only one electrode region 48 although this single region has two connectors namely 44 and 45. The configuration has the result that the optical effects associated with the electrical field are applied over the whole of the cross section of the core over a substantial length.

The first stage in the preparation of the embodiment shown in FIGS. 20–23 requires the deposition of an annulus of silica highly doped with germanium and phosphorus to give electrical conductivity plus boron and/or fluorine to reduce the refractive index. This layer is deposited, as is usual, on the inner surface of the substrate tube formed of pure silica. The ratio of the dopants in the deposit is such that the deposit has the same refractive index as the substrate tube 40.

After deposition of the annulus an etchant gas, e.g. $SF_6$ or $CCl_2F_2$, is flowed through the bore of the tube and diametrically opposite segments of the tube, indicated by numeral 61, are heated to activate the etchant. The result is that two segments of the deposit are removed give the cross section shown in FIG. 20. The result is a silica substrate tube 40 with segments 61.1 and 61.2 of doped silica deposited thereon.

Figure 20:
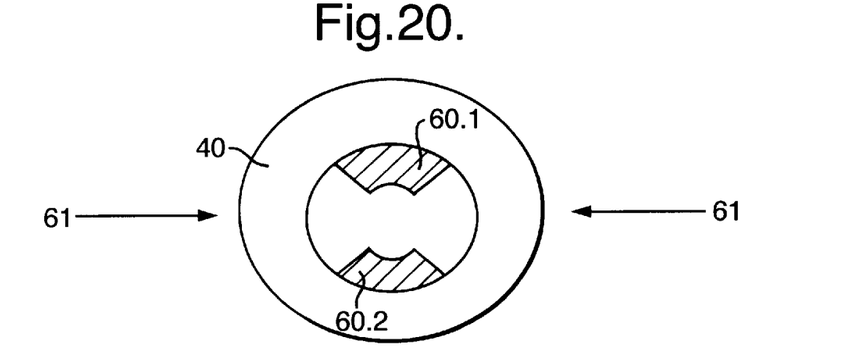
FIG. 20 is a transverse cross section of partially prepared perform for a fibre embodiment having a single dielectric region and two electrode regions.
Figure 21:
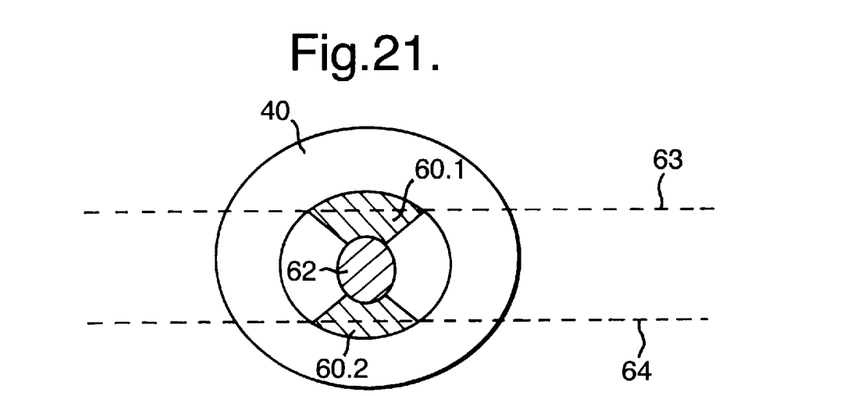
FIG. 21 is a cross section through the completed preform of FIG. 20.

The cross section shown in FIG. 20 is collapsed and, part way through the collapse, a silica rod 62 is inserted into the bore and the preparation the perform is completed by the rod-in-tube process to give the cross section shown in FIG. 21. At this stage, as was described for previous embodiments, the perform is ground. This leaves end segments of circular cross section to engage with the fibre pulling machine and the centre section is ground flat along the lines 63 and 64 of FIG. 21.

Figure 22:
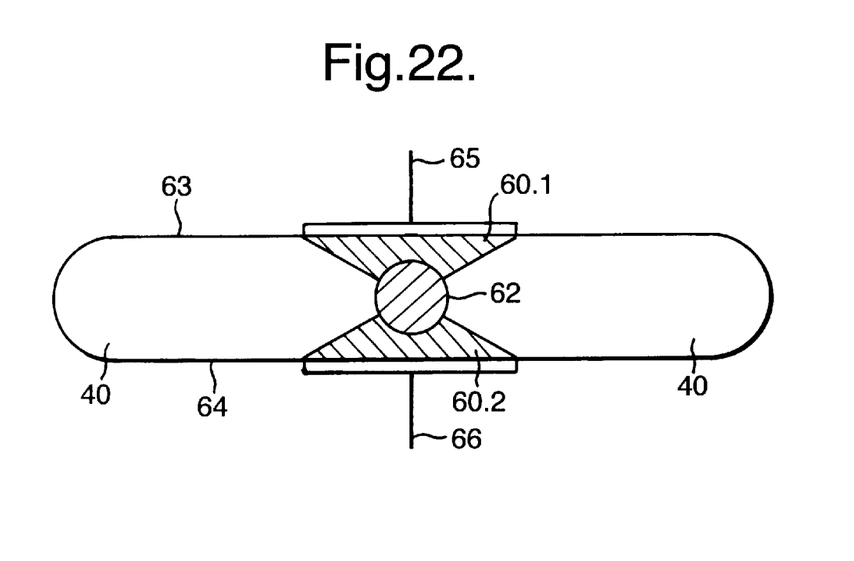
FIG. 22 is a transverse cross section through fibre prepared from the preform of FIG. 21.
Figure 23:
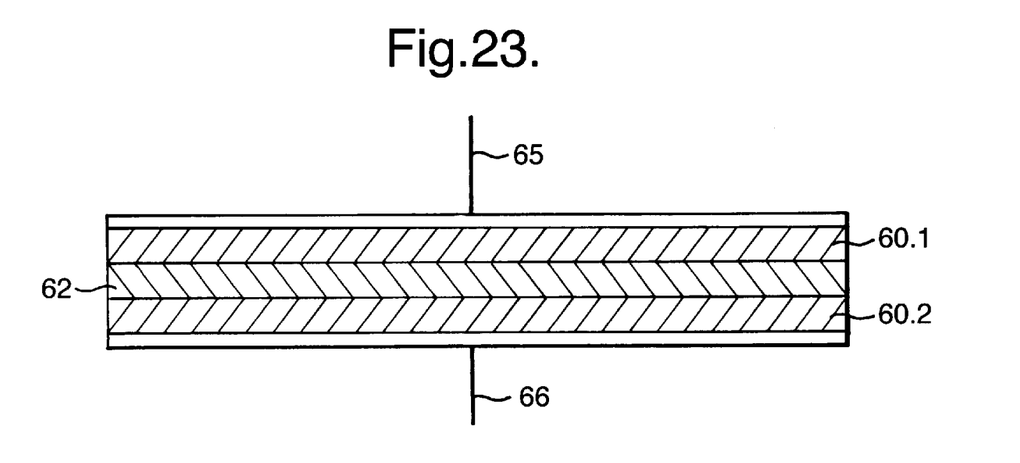
FIG. 23 is a longitudinal cross section through the fibre illustrated in FIG. 22.

The perform is now pulled into fibre which is cut into suitable lengths for devices and the flat surfaces 63 and 64 are metallised for the attachment of connectors 65 and 66. The transverse cross section of the fibre is shown in FIG. 22 and longitudinal cross section is shown in FIG. 23.

The preparation of the device is completed by illumination and polling as described above. It can be seen that the device has a single dielectric region 62 which is in contact with two electrode regions 60.1 and 60.2. The two electrode regions are diametrically opposite one another and the substrate tube 40 also contacts the core 62 between the dielectric regions 60.1 and 60.2. When control voltages are applied to the connectors 65 and 66 the optical properties of a substantial length of core are affected. It is also emphasised that, because there is only one dielectric region, the optical properties are affected over the full cross section of the core.

It is convenient to attach fibre tails to all of the embodiments described above. These fibre tails are not illustrated in any drawings but they are convenient for incorporating the devices into optical systems. It is appropriate to attach the fibre tails before polling so that the optical properties of the device can be monitored during polling. Also, the heating needed to attach the tails is applied before poling so that the possibility of the leakage of charge (caused by the enhanced conductivity at high temperarures) is reduced.

What is claimed is:

1. An optical device comprising:
   a) a waveguiding configuration including a glass cladding and glass core,
   b) an electrical capacitive configuration including one or more glass electrode regions and one or more glass dielectric regions, said electrical capacitive configuration being located for interaction either with the evanescent fields of signals traveling in the core or with the signals themselves or with both the signals and their evanescent fields, and
   c) metallic electrical leads connected to said one or more electrode region for applying control signals thereto.

2. An optical device as in claim 1, wherein the core includes at least one dielectric region and at least one electrode region.

3. An optical device as in claim 1, wherein said one or more electrode region included in the core is connected to a glass terminal region located in the cladding.

4. An optical device as in claim 1, wherein the core comprises a single dielectric region which is surrounded by a single electrode region said electrode region being located in the cladding.

5. An optical device as in claim 1, which comprises a single dielectric region located in the core said core being in contact with two electrode regions each of which is located in the cladding.

6. An optical device as in claim 1, wherein the core of the waveguide is formed of at least one silica glass composition and at least a portion of the cladding is formed of at least one silica glass composition, wherein the dielectric regions are either pure silica or silica doped with germanium to adjust the refractive index and the electrode regions are formed of silica doped with germanium and/or phosphorus to provide electrical conductivity with boron and/or fluorine to adjust the refractive index.

7. An optical device as in claim 1, which includes permanent electric fields located so as to affect the dielectric region, some of the dielectric regions or all of the dielectric regions.

8. A method of preparing an optical device including one or more glass electrode regions and one or more glass dielectric regions which method comprises preparing a precursor of the device and poling said precursor to produce permanent electric fields within the structure, wherein the precursor comprises:
   (a) a waveguiding configuration including a glass cladding and a glass core,
   b) the precursor of an electrical capacitive configuration including the precursors of one or more glass electrode regions and precursors of one or more glass dielectric regions, said precursors of the electrical capacitive configuration being located for interaction either with the evanescent fields of signals traveling in the core or with the signals themselves or with both the signals and their evanescent fields, and
   (c) metallic electrical leads connected to said precursors of said one or more electrode region, and
   wherein said poling comprises applying a poling voltage to the electrical leads whereby permanent electric fields are produced within the structure.

9. A method as in claim 8, wherein the precursors of the dielectric regions are formed of a glass with a high electrical resistivity and the precursors of the electrode regions are formed of a glass having a lower electrical resistivity.

10. A method as in claim 9, wherein the precursors of the dielectric regions are formed either of pure $SiO_2$ or $SiO_2$ lightly doped to adjust its refractive index in accordance with waveguiding requirements.

11. A method as in claim 8, wherein the electrode regions comprise at least 70% by weight of $SiO_2$ with $GeO_2$ to increase the refractive index, the electrical conductivity and photoconductivity.

12. A method as in claim 8 wherein the device is irradiated during the poling.

13. A method as in claim 12, wherein the wavelength of the radiation is within the range 190 nm to 270 nm.

14. A method as in claim 12, wherein the poling is carried out at a temperature from ambient up to 400° C.

15. An optical signal processing device comprising:
   an optical signal guiding path including glass material; and
   said guiding path including an electrically conductive glass electrode region.

16. An optical signal processing device as in claim 15 wherein said guiding path includes a non-electrically conducting glass dielectric region adjacent said glass electrode region.

17. An optical signal processing device as in claim 16 including a plurality of said glass electrode regions and a plurality of said glass dielectric regions.

18. An optical signal processing device as in claim 17 further comprising metallic electrical conductors in contact with said glass electrode regions.

* * * * *